United States Patent
Begli et al.

(10) Patent No.: US 8,729,008 B2
(45) Date of Patent: May 20, 2014

(54) STARCH HYDROLYZATE SOLUBILIZER FOR METAL IONS

(75) Inventors: Alireza Haji Begli, Ramsen (DE); Markwart Kunz, Worms (DE); Christine Kroener, Worms-Pfeddersheim (DE); Matthias Moser, Gruenstadt (DE); Bart Levecke, Mechelen (BE)

(73) Assignee: Suedzucker Aktiengesellschaft Mannheim/Ochsenfurt, Mannheim (DE)

( * ) Notice: Subject to any disclaimer, the term of this patent is extended or adjusted under 35 U.S.C. 154(b) by 99 days.

(21) Appl. No.: 13/125,271

(22) PCT Filed: Oct. 19, 2009

(86) PCT No.: PCT/EP2009/007475
§ 371 (c)(1),
(2), (4) Date: Jun. 1, 2011

(87) PCT Pub. No.: WO2010/046070
PCT Pub. Date: Apr. 29, 2010

(65) Prior Publication Data
US 2011/0250534 A1    Oct. 13, 2011

(30) Foreign Application Priority Data
Oct. 20, 2008    (DE) .......................... 10 2008 053 607

(51) Int. Cl.
*C11D 3/22*    (2006.01)

(52) U.S. Cl.
USPC ........... 510/470; 510/474; 510/514; 510/531; 510/532; 510/220; 510/276; 510/323; 510/377; 536/123.13

(58) Field of Classification Search
USPC ........ 510/470, 474, 514, 531, 532, 220, 276, 510/323, 377; 536/123.13
See application file for complete search history.

(56) References Cited

U.S. PATENT DOCUMENTS

| | | | |
|---|---|---|---|
| 4,985,553 A * | 1/1991 | Fuertes et al. ................ | 536/124 |
| 6,187,055 B1 | 2/2001 | Kottwitz et al. | |
| 2007/0112186 A1* | 5/2007 | Kowalczyk et al. ..... | 536/123.13 |

FOREIGN PATENT DOCUMENTS

| | | |
|---|---|---|
| DE | 2 023 944 A1 | 3/1971 |
| DE | 692 24 377 T2 | 5/1998 |
| DE | 692 29 301 T2 | 12/1999 |
| DE | 101 12 136 A1 | 10/2002 |
| DE | 103 19 917 A1 | 12/2004 |
| EP | 0 142 725 A1 | 5/1985 |
| EP | 0 232 202 A2 | 8/1987 |
| EP | 0 472 042 A1 | 2/1992 |
| EP | 0 892 041 A1 | 1/1999 |
| FR | 2 722 200 A1 | 1/1996 |
| GB | 1 299 646 A | 12/1972 |
| WO | WO-92/18542 A1 | 10/1992 |

OTHER PUBLICATIONS

Santacesaria et al., Carbohydrate Polymers, vol. 23, pp. 35-46 (1994).

* cited by examiner

*Primary Examiner* — Charles Boyer
(74) *Attorney, Agent, or Firm* — Dickstein Shapiro LLP

(57) ABSTRACT

The invention relates to solubilizers for metal ions and poorly soluble metal compounds, containing an oxidation product of starch hydrolysate as a solubilizing agent, to a method for solubilizing metal ions and to the use of said solubilizer.

27 Claims, 2 Drawing Sheets

STARCH HYDROLYZATE SOLUBILIZER FOR METAL IONS

The invention concerns a solubilizing agent for metal ions and sparingly soluble metal compounds that contains an oxidation product of a starch hydrolyzate as solubilizing agent, a method for solubilizing metal ions, and the use of said solubilizing agent.

PRIOR ART

Because of their tendency to form sparingly soluble precipitates, metal salts can give rise to problems in many chemical and industrial fields and in the most varied chemical engineering processes. Industrially relevant sparingly soluble metal compounds are, above all, the oxides, hydroxides, phosphates, carbonates, oxalates, silicates and similar compounds, especially those of the alkaline earth metals and metals of side groups 1-8 and the 3rd main group of the periodic table of elements. The solubilization of metal ions, especially sparingly soluble metal compounds, for example calcium carbonate, which forms sparingly soluble deposits, is crucial for maintaining function of industrial processes and plants. Preventing the precipitation of troublesome metal compounds is relevant in particular in processes that involve working with aqueous solutions. As is known, complexing agents or complexing means, also called complex-forming agents, which "shield off" the metal ions and keep the metal compounds, are used for this. Typical agents of this kind are, for example, EDTA (ethylenediaminetetraacetate), nitrilotriacetic acid (NTA), citric acid or gluconic acid.

EP 0472 042 A1 describes oxidized glucosidic oligomers that can be used for sequestering calcium. Santacesaria et al., Carbohyate Polymers 23 (1994), pp. 35-46, show that, through the mode of their preparation, these are oligomers in which the hydroxyl groups on C2 and C3 are oxidized. The dispersing effect of oxidized carbohydrates is generally connected with the carboxyl function at the C2 and C3 atoms. Known complexing agents based on carbohydrate oligomers therefore have carboxyl functions at least at the C2 and C3 atoms.

Known complexing agents based on oxidized carbohydrates, for example Na gluconate, readily crystallize from a highly concentrated aqueous solution (more than, for example, 40% DM (dry matter)). Disadvantageously, spoilage rapidly takes place in a less concentrated solution during storage. In addition, a high water content in the product is generally undesirable. Disadvantageously, these products must be converted to crystalline form for storage and for transport. This makes usage and further processing difficult. On the other hand, to obtain highly concentrated storage-stable solutions/syrups, additional cost-intensive processes, for example ion exchange or electrodialysis, must be used.

Task

The invention is based on the technical problem of making available improved solubilizing agents that overcome the disadvantages known from the prior art.

The invention is further based on the technical problem of making available solubilizing agents that can be produced directly, preferably without intermediate treatment or processing, as highly concentrated syrups in production, where the syrups, preferably with 40% DM or higher, especially about 60-80% DM, are readily storable and do not spoil. Moreover, the syrups should also not show a tendency to crystallize even at lower temperatures, so that storage and transportation of the product becomes simpler.

The invention is further based on the technical problem of making available solubilizing agents that show good metal ion binding, i.e., good dissolving capacity or binding capacity for sparingly soluble metal ions or metal compounds, especially for alkaline earth metals like calcium and magnesium, at a very high pH value, especially at a pH value of about 13 or higher.

The invention is further based on the technical problem of making available solubilizing agents that show good metal ion binding even at a basic pH value, for example at a pH value of at least 8, especially for iron and possibly other metal ions of the 8th side group and the 1st to 7th side groups.

The invention is further is based on the technical problem of making available highly effective solubilizing agents that can be used and that exhibit the desired effect in less than equimolar amounts with respect to the sparingly soluble metal ions or metal compounds that are to be solubilized, for example in a mol ratio of 1 mol solubilizing agent to 2 mol or more of the metal compound.

The invention is based on the technical problem of making available solubilizing agents that have improved dispersing capacity for sparingly soluble metal ions or metal compounds, for example for calcium and calcium compounds.

The invention further is based on the technical problem of making available solubilizing agents that are readily biodegradable, i.e., by microbial enzymes, and above all can be returned to the natural material cycle.

The invention solves its underlying technical problem primarily by making available a solubilizing agent for metal ions and sparingly soluble metal compounds that contains, as the solubilizing agent, an oxidation product or oxidation product mixture that can be prepared by C1 selective oxidation of a starch hydrolyzate.

The invention therefore concerns the oxidation product or oxidation product mixture that is characterized below in more detail, especially when it is employed or used for solubilization of metal ions or sparingly soluble metal compounds.

The solubilizing agent or means for solubilizing in accordance with the invention is characterized above all by the fact that it involves oxidized monomer and oligomer carbohydrates, especially aldonic acids, or mixtures of such compounds, in which the aldehyde groups (semiacetals) are oxidized selectively and preferably exclusively at the C1 atom of the monomer or oligomer. The solubilizing agent or means in accordance with the invention is therefore not polyoxidized, but rather essentially only monooxidized, preferably exclusively monooxidized. A preferred embodiment of the invention therefore includes a monomer and oligomer carbohydrates in which the C2 and C3 atoms are oxidized to carboxyl functions. In a preferred variant in accordance with the invention a particular catalytic oxidation process that exclusively allows the formation of one carboxyl group in C1 position per molecule is used for oxidation of the carbohydrates, especially therefore components of the starch hydrolyzate or its derivatives; hydroxyl groups in positions C2 and C3 or the relevant C2 and C3 positions in the chain of the oligomers remain intact in the carbohydrate molecule.

Without wishing to be bound to theory, the other unoxidized hydroxyl groups in the carbohydrate molecule oxidized in accordance with the invention support the cation-binding and solubilizing action of the C1-position single carboxyl group. This is true above all in the case of di- and oligosaccharides. This additive effect was found in rejection of the earlier idea that only the presence of a number of carboxyl groups in such saccharide molecules enables a binding of metal ions in the form of a complex and it is a component of the technical advantage asserted for the solubilizing agent in accordance with the invention.

The agent or means for mediating the dissolving of metal ions in accordance with the invention is a product previously unknown in this context of solubilization in accordance with the invention.

The oxidation product or oxidation product mixture used as solubilizing agent in accordance with the invention surprisingly can also be produced, stored, transported and processed in the form of a highly concentrated syrup, above all with 60-80% DM, typically 70% DM, since a disadvantageous tendency to crystallize does not arise with this product.

The invention provides for the use of the solubilizing agent or solubilizing means in accordance with the invention above all for dissolving deposits of sparingly soluble metal compounds or to prevent the formation of such deposits. A preferred area for use of this agent is in cleaner compositions, in which the solubilizing agent or means in accordance with the invention is used together with at least one surface-active substance, optionally together with an alkalinization agent, for example sodium hydroxide, and other optional auxiliary substances. In such compositions synergistic effects preferably occur through interaction, in particular with the surface-active substances and alkalinity. However, the invention is not limited to such applications of the agent in accordance with the invention; other specific applications and uses are described below.

DETAILED DESCRIPTION OF THE INVENTION

It surprisingly turned out that a carbohydrate or a carbohydrate composition oxidized primarily exclusively at the C1 atom is suitable as an improved solubilizing agent, i.e., it becomes a better solubilizing agent. Moreover, it surprisingly turned out that the solubilizing agent in accordance with the invention, in particular in aqueous solutions that have a high or very high pH value, thus are highly alkaline, especially aqueous solutions, is very well suited to keeping metal ions and sparingly soluble metal compounds, above all alkaline earth metals, in solution. A high pH value is understood to be a pH range of 11 and higher, while a very high pH is understood to be in the range of 13 and higher. In the case of metals like iron and other side group metals of the 8th side group and also the 1st through 7th side groups, the invention also preferably provides for use at pH values in the range of pH 8-10, especially about pH 8 or 9, since an especially strong solubilizing effect can be found there.

The inventors also surprisingly found that the property of keeping metal ions and sparingly soluble metal compounds in solution or putting them in solution, thus redissolving existing precipitates or deposits, is especially highly pronounced with the agent in accordance with the invention. This is especially in comparison with other agents having comparable substance groups, i.e., oxidized carbohydrates, particularly gluconic acid or gluconate and lactobionic acid or lactobionate. The agent in accordance with the invention is surprisingly also much more effective than polycarboxyl compounds, for example polyoxidized oligosaccharides.

The agent in accordance with the invention has in particular the property not only of acting as a complexing agent like the known oxidized carbohydrates, but rather generally as a so-called solubilizing agent. This includes, without wishing to be bound to theory, the function as a sequestering agent and as a dispersing agent as well as related or derived effects. In each case according to the area of use, concentration ratio and other conditions one or another effect or mode of functioning of the agent in accordance with the invention will predominate.

It surprisingly turned out that only a little of the solubilizing agent in accordance with the invention needs to be used for effective solubilization of metal ions or metal compounds, in particular less than equimolar amounts with respect to the metal ions. The solubilizing agent in accordance with the invention needs to be used in accordance with the invention in very small amounts (compared to the amount of metal ions to be dissolved or to be kept in solution) in order to solubilize metal ions and sparingly soluble metal compounds. For example, with 1 mol of the solubilizing agent in accordance with the invention at least 2 mol or more and especially 3 mol or more of a metal ion, for example calcium ions or a sparingly soluble metal compound, for example calcium carbonate, can be solubilized, i.e., kept in solution or brought into solution. In a preferred variation the solubilizing agent therefore is used in a mol ratio of 1:2 or more, preferably 1:3 or more (solubilizing agent to metal compound).

Without wishing to be bound to theory, the solubilizing agent in accordance with the invention can therefore act as a sequestering agent, exclusively and/or additionally as a dispersing agent and/or as a complexing agent.

The solubilizing agent is characterized by its effect, that it, especially in aqueous solutions, keeps metal ions that are particularly in the form of sparingly soluble metal compounds in solution and thus prevents or inhibits their precipitation. "Solubilization" in connection with this invention is understood to mean both keeping in solution and bringing into solution of sparingly soluble metal compounds and especially metal salts. The chemical mode of action, thus the type and way that the solubilizing agent keeps or brings ions into solution is, in accordance with the invention, not necessarily limited to a single mechanism that is known in theory.

Preferably in accordance with the invention the solubilizing agent acts as a sequestering agent, preferably exclusively. In connection with this invention a "sequestering agent" is understood to mean a substance or compound that changes the properties, especially the solubility, of an ion through interaction with it.

Preferably in accordance with the invention the solubilizing agent acts as a dispersing agent, preferably exclusively. Characteristic for a "dispersing agent" in the meaning of the invention is that it can be used in far lower than equimolar amounts with respect to the metal ion the precipitation of which is to be prevented.

It is preferably provided in accordance with the invention that, with 1 mol of the solubilizing agent in accordance with the invention, at least 2 mol or more, preferably 3 mol or more, possibly 4 mol or more, of metal ions or metal compounds are solubilized. The ratio of metal compound to agent/solubilizing agent in accordance with the invention preferably always amounts to more than 1:1, especially 2:1 or more and more preferably 3:1 or more.

Without wishing to be bound to theory, complexing agents, also called complex-forming agents, are used in at least equimolar amounts with respect to the metal ion the precipitation of which is to be prevented. In an alternative embodiment of the invention, the solubilizing agent in accordance with the invention acts as, and in another preferred variation of the invention, chiefly and preferably exclusively, as a complexing agent. The ratio of metal compound to agent/solubilizing agent in accordance with the invention in this case amounts preferably to about 1:1, in order to complex all of the metal ions in the solution.

Preferably, the solubilizing agent in accordance with the invention is obtained from a starch hydrolyzate. Starch hydrolyzates, for example glucose syrups, are obtained in a substantially known way. Especially preferably, the starch hydrolyzate is chosen from the so-called technical glucose syrups or corn syrups or the so-called maltodextrins. Generally, "starch hydrolyzates" are understood in connection with this invention also to mean mixtures of or a composition with glucose, maltose and oligomer glucose compounds.

Preferably, the starch hydrolyzate that is used has a content of at least 5 wt % or more, preferably 50 wt % or more, especially preferably 85 wt % or more, di- or oligomer compounds with a degree of polymerization (DP) from DP2 to DP4. Especially preferably, the starch hydrolyzate has a content of 10 wt % or more, preferably 25 wt % or more, preferably 50 wt % or more, preferably 75 wt % or more, or 85 wt % or more of compounds with DP2 to DP4, preferably compounds with DP2. Preferably, the starch hydrolyzate has a content of up to 90 wt % compounds with DP2, preferably up to 95 wt %. Preferably, the starch hydrolyzate has a content of 5-90 wt %, alternatively 10-85 wt %, DP2 compounds. The remainder in the starch hydrolyzate is accordingly DP1, i.e., above all glucose, and possibly other compounds with DP3 or DP4 and higher.

In one variation of the invention the starch hydrolyzate contains DP2 and DP3 compounds in an amount of 85 wt % or less.

In accordance with the invention the starch hydrolyzate, especially in the form of a technical glucose syrup, preferably has a dextrose equivalent (DE) of at least DE 40; the range of DE 50 to DE 60 is preferred, and the range of DE 50 to DE 55 is especially preferred. In an alternate variation of the starch hydrolyzate the DE is 90 or more.

The invention provides for obtaining the agent or means in accordance with the invention from the starch hydrolyzate defined in more detail above, its direct oxidation, namely a preferred catalytic C1-selective oxidation. It is provided in accordance with the invention that in this case the molecules of the starch hydrolyzate or a starch hydrolyzate composition are oxidized to an acid group/carboxyl group at the relevant first anomeric C atom of the molecule, i.e., at the atom in C1 position, which carries the primary terminal hydroxyl group or the aldehyde group.

In so doing, in accordance with the invention a product composition or product mixture of C1-oxidized monocarboxylated carbohydrates is obtained as oxidation product. The invention therefore preferably concerns aldonic acid compositions. In accordance with the invention the oxidation product preferably has more than 80 wt %, especially more than 90 wt % and especially more than 95 wt % monocarboxylated monosaccharides or polysaccharides and/or aldonic acids.

A substantially pure substance, possibly with contaminants, is obtained in another variation.

Methods for producing such an agent in accordance with the invention are known, for example, from DE 103 19 917 A1 and DE 10 2005 036 890 A1, the contents of which are completely incorporated into the application.

For preparation of an agent in accordance with the invention one can for example, use a method in which the starch hydrolysis, especially in aqueous solution, is reacted in the presence of oxygen and a gold catalyst comprising nanodisperse gold particles on a support, especially a carbon support or a metal oxide support. In this way in particular an aldehyde group of the starch hydrolyzate can be selectively oxidized to a carboxyl group. The metal oxide support of the gold catalyst can be, for example, a $TiO_2$ support or an $Al_2O_3$ support. The supported gold catalyst can contain, for example, about 0.1-5% gold, preferably about 0.5-1% gold. The oxidation can be carried out at a pH of 7-11 and a temperature of 20-140° C., preferably 40-90° C. The oxidation can be carried out, for example, at a pressure of 1-25 bar. In the process oxygen and/or air can, for example, be bubbled through the starch hydrolyzate during the oxidation. In the process the ratio between the amount of starch hydrolyzate and the amount of gold contained on the metal oxide support can, for example, be greater than 1000.

One such catalyst for selective oxidation of the starch hydrolysis can be prepared, for example, without this preparation process being understood as limiting, by bringing a support into contact with an aqueous solution of an acid chloroauric acid precursor solution in an "incipient wetness" process. Such an impregnated catalyst precursor is then dried, particularly at temperatures greater than or equal to room temperature, preferably 60-200° C., especially preferably 60-100° C. The support is then preferably made available in dry form and the volume of the aqueous solution of the chloroauric gold precursor responds, especially maximally, to the pore volume of the support. The aqueous solution of the chloroauric gold precursor is added to the dry support, for example, stepwise and only in a volume up to which the support can no longer absorb any more solution. The aqueous solution of the chloroauric acid precursor can be a solution of $HAuCl_4$ in aqueous hydrochloric acid with concentration of 0.1 mol/L to 12 mol/L, preferably 1-4 mol/L, optionally in combination with at least one other acid. Another step of reduction of the catalyst precursor can be carried out, especially in a stream of hydrogen, at temperatures of greater than or equal to 250° C., or as a liquid phase reduction. The reduction can in this case be carried out for 10-300 min, preferably 80-120 min. The stream of hydrogen can have a hydrogen content of 5-15 vol %, preferably 10 vol %, and optionally can contain an inert gas. It is possible to add to the support and/or the aqueous solution of the chloroauric acid precursor additional doping additives, chosen from oxides of the alkali metals, alkaline earth metals and rare earth metals, preferably in an amount of 0.01-1 wt %.

The invention also solves the industrial problem underlying it through the use of the agent in accordance with the invention as a solubilizing agent. Preferably, the use takes place in a polar protic solvent, preferably however in aqueous solution. One preferred variation is the use of a solubilizing agent in accordance with the invention for sequestration of such metal ions. One preferred variation is the use of the solubilizing agent in accordance with the invention for complexing such metal compounds. An object of the invention is the use of the solubilizing agent for such metal compounds, where the agent the oxidation product, which can be or is produced from the C1-selective oxidation of a starch hydrolyzate that contains it or consists thereof.

In accordance with the invention, the agent in accordance with the invention preferably contains not less than 5 wt % and preferably more than 50 wt %, especially preferably more than 75 wt %, especially more than 85 wt %, oligomer compounds with a degree of polymerization DP2 to DP3, preferably DP2. In accordance with the invention the oxidation product preferably contains 5-90 wt %, alternatively preferably 10-85 wt %, compounds with DP2 to DP3, preferably DP2.

In an alternate embodiment of the invention the solubilizing agent is not obtained directly from an industrial starch hydrolyzate, but still contains more than 90 wt % C1-selectively-oxidized carbohydrate, especially C1-selectively-oxidized aldose, or consists thereof.

Preferably in accordance with the invention, the solubilizing agent is used for solublization of metal compounds in particular di- or trivalent metal cations. The solubilization of metal ions and metal compounds of metals of the 2nd or 3rd main group and the 1st, 2nd, 3rd, 4th, 5th, 6th, 7th, and 8th side groups of the periodic table of elements should be achieved, especially metals from which sparingly soluble metal compounds form. The metals are especially chosen from the group consisting of calcium, magnesium, manganese, copper, iron, zinc, nickel, chromium and aluminum.

In connection with the invention "sparingly soluble" is understood to mean a property of a metal compound that, in a solvent, especially in a polar, particularly protic solvent, especially water ($H_2O$), it dissolves only to a small extent. "Solution" here is understood to mean a single-phase homogeneous compound or homogeneous mixture of solvent and dissolved molecule. Sparingly soluble metal compounds in accordance with the invention have a solubility of 1 g per L solvent or less (100 mg/L or less) and especially 1 mg/L or less. Of course, the solubility is dependent on factors like temperature, pH, pressure and the presence of other ions in the solution and can be affected thereby.

The invention concerns above all the use with sparingly soluble metal compounds chosen from: carbonates, phosphates, sulfates, sulfides, hydroxides, oxides, halogen salts (especially chlorides and bromides) and compounds of organic acids, carboxylic acids and/or alcohols like oxalates, soaps (lime soaps) and ethanolates, as well as compounds of organic polymers like pectate.

Especially preferably, the solubilizing agent is used to solubilize calcium compounds like calcium carbonate, calcium hydroxide and calcium phosphate. Preferably in accordance with the invention, the solubilizing agent is used to solubilize magnesium compounds like magnesium carbonate, magnesium hydroxide and magnesium sulfate. Preferably in accordance with the invention, the solubilizing agent is used to dissolve manganese compounds like manganese dioxide/manganese oxide and manganese hydroxide. Preferably in accordance with the invention, the solubilizing agent is used to solubilize copper compounds like copper hydroxide and copper. carbonate. Preferably in accordance with the invention, the solubilizing agent is used to solubilize iron compounds like iron hydroxide and iron carbonate. Preferably in accordance with the invention the solubilizing agent is used to solubilize aluminum compounds like aluminum hydroxide.

Preferably, the agent or solubilizing agent in accordance with the invention serves to prevent the precipitation of metal ions as sparingly soluble compounds. In another preferred variation the agent or means in accordance with the invention serves to prevent or dissolve precipitates or deposits of such sparingly soluble metal compounds.

Preferably, the solubilizing agent itself is preferably completely or at least alternatively in the form of a salt, preferably as an alkali salt, preferably a sodium salt.

An object of the invention is also a solubilizing agent for metal ions, preferably di- and/or trivalent metal cations, that contains the oxidation product in accordance with the invention as solubilizing agent, preferably as the only solubilizing agent. The use of an alkali metal salt of the oxidation product in accordance with the invention as solubilizing agent for binding metal compounds of metals of the 2nd main group, particularly calcium ions and/or magnesium ions, at a high pH value of 11 or more, especially at a pH value of 12 or more, really especially preferably at a pH value of 13 or more, or to bind metal compounds of side group metals, especially iron and other metals of the 8th side group and also metals of the 1st through 7th side groups, at a pH of 8 or more, especially at a pH of 8-9, is especially preferred.

The invention also solves the underlying industrial problem by making available a method for solubilizing metal ions and sparingly soluble metal compounds, especially ones that form sparingly soluble precipitates or deposits in aqueous solutions, comprising at least the step: bringing the agent or solubilizing agent into contact under conditions that enable the formation of a readily soluble unit, for example a complex, from at least one metal ion and at least one molecule of the solubilizing agent. Preferably in accordance with the invention the readily soluble unit consists of one or more metal ions and one molecule of the solubilizing agent. Preferably in accordance with the invention, the precipitate-inhibiting unit consists of at least two, preferably at least three, metal ions and one molecule of the solubilizing agent.

Preferably in accordance with the invention, the method is carried out in a solution of a polar protic solvent, but especially in aqueous solution. Preferably in accordance with the invention the method is carried out a basic pH value (measured under standard conditions, 21° C.). Preferably in accordance with the invention, the method is carried out at a pH of 8 or higher, in another variation 11 or higher, especially preferably at a pH of 12 or higher, especially at a pH of 13 or higher. The optimum solubilizing effect lies in a first variation for metal compounds of the side group metals (1st through 8th side groups), especially iron, at pH 8-9; in another variation the optimum, especially for alkaline earth metal ions, especially calcium and magnesium, lies at pH 13-14.

It surprisingly turns out that a solubilizing agent in accordance with the invention can be used very well as a solubilizing agent for metal compounds in basic cleaning solutions, especially basic industrial cleaning solutions, as a salt or as an acid that can be neutralized by the end user in a composition. Under such conditions the solubilizing agents in accordance with the invention are surprisingly better alternatives to traditional agents like NTA and EDTA.

In a use that is preferred in accordance with the invention the solubilizing agent in accordance with the invention is used in a liquid mixture with other ingredients like sodium hydroxide, sodium silicate, phosphates and/or surfactants. Without wishing to be bound to theory, synergistic effects resulted from the interaction of the surface-active substances, the alkalis and the solubilizing agent in accordance with the invention.

An object of the invention is a use as a biologically readily degradable solubilizing agent. The inventor surprisingly found that the agent in accordance with the invention is especially readily decomposable and degradable in substantially known degradation pathways and metabolic processes, especially through microbiological enzyme activity, because of its chemical constitution, and above all harmful compounds do not persist. Accordingly, the invention calls for the agent in accordance with the invention to be used in processes in which high environmental compatibility, especially biodegradability, must be guaranteed.

An object of the invention is the use of the solubilizing agent to prevent the precipitation and/or dissolving of sparingly soluble calcium compounds like lime/lime spar, calcite, dolomite, boiler scale and mixed carbonates and calcium soaps, as well as sparingly soluble magnesium compounds. The presence of calcium and magnesium in aqueous solutions basically presents a high risk for the formation of deposits, so-called lime deposits, since these metal ions are, as is well known, sparingly soluble compounds.

An object of the invention is also the use of the solubilizing agent as builder for detergents and washing agents, optionally in combination with surface-active substances, alkalis, silicates, aluminosilicates and/or phosphates.

An object of the invention is also the use of the solubilizing agent to improve the wetting of surfaces.

An object of the invention is also the use of the solubilizing agent to remove microorganisms from deposits, optionally in combination with sulfamic acid.

An object of the invention is also the use of the solubilizing agent for cleaning the surfaces of molds, optionally in combination with alkalis like sodium carbonate and its hydrates. The use of the solubilizing agent to clean molds used for glass manufacturing is preferred in accordance with the invention.

Molds used in glass manufacturing require regular cleaning in order to prevent deposits of rust, silicate and carbons. Preferably, the solubilizing agent is used for this in a washing agent with a concentration of 50-100 g/L. Preferably, such a washing solution can additionally contain about 200 g soda.

An object of the invention is also the use of the solubilizing agent to remove concrete deposits and soiling.

An object of the invention is also the use of the solubilizing agent to remedy or prevent deposits and films in industrial plants or machines.

An object of the invention is also the use of the solubilizing agent to remedy rust deposits and soiling.

An object of the invention is also the use of the solubilizing agent to remedy dye deposits and soiling.

An object of the invention is also the use of the solubilizing agent to remedy calcium sulfate deposits.

An object of the invention is also the use of the solubilizing agent to degrease metal surfaces.

An object of the invention is also the use of the solubilizing agent for degreasing, optionally in combination with alkalis like carbonates and hydroxides.

In the degreasing of metal surfaces, redeposition of sparingly soluble salts on the metal surface should be prevented. This can be achieved by adding the solubilizing agent in accordance with the invention to the degreasing solution.

An object of the invention is also the use of the solubilizing agent in electroplating. The use of the solubilizing agent to remedy or prevent deposits and films in electroplating baths is preferred in accordance with the invention.

An object of the invention is also the use of the solubilizing agent as a component of dishwashing compositions. An object of the invention is also the use of the solubilizing agent in dishwashing. An object of the invention is also the use of the solubilizing agent in industrial dishwashing is preferred in accordance with the invention. The solubilizing agent can be used in a dishwashing composition, which can be in solid, especially powdered, form or in liquid form. Solutions used in industrial dishwashing are preferably more alkaline than those used in the home.

An object of the invention is also the use of the solubilizing agent to clean hard surfaces. The cleaning of hard surfaces such as floors or work surfaces requires liquid wash solutions in which the active agent is in concentrated form. The wash solutions must enable the removal of traces of mineral and organic materials. The use of the solubilizing agent in accordance with the invention proved to be advantageous, especially in liquid formulations in which the solubilizing agent can be used in a higher concentration because of its low tendency to crystallize.

An object of the invention is also the use of the solubilizing agent in cleaning glassware.

The use of the solubilizing agent in accordance with the invention in glassware cleaning is advantageous, since the solubilizing agent is readily biodegradable. Moreover, a solubilizing agent in accordance with the invention is very efficient when used in alkaline media and is resistant to hydrolysis. The use of the solubilizing agent in accordance with the invention prevents the formation of deposits and films and leads to effective cleaning of the bottle neck. Moreover, the formation of lime deposits and boiler scale in the wash apparatus, washing machines and cleaning agent containers is prevented. In cleaning glassware that has aluminum closures, moreover, the formation of aluminum hydroxide deposits in the cleaning system is prevented. Also there can be a savings of costs and resources, especially water, since the rinsing processes can be made simpler and shorter because of the low toxicity of the solubilizing agent in accordance with the invention. Surprisingly, improved removal of inks was also seen.

An object of the invention is also the use of the solubilizing agent in the cleaning of machines and equipment in the food industry.

An object of the invention is also the use of the solubilizing agent to clean filters, especially ultrafiltration membranes, for example in the dairy industry.

Ultrafiltration is a separation technique that is very common in the dairy industry for removing and concentrating macromolecules of milk and lactoserum. The membranes that are used require regular cleaning in order to guarantee sufficient selectivity and permeability and to prevent microbiological contamination.

When the solubilizing agent is used to clean filters, the solubilizing agent is used in a solution that preferably contains other sequestering agents like EDTA. However, the EDTA content of a wash solution can be considerably reduced through the use of the solubilizing agent in accordance with the invention.

An object of the invention is also the use of the solubilizing agent to prevent deposits in beer manufacturing. In the brewing industry insufficient cleaning can lead to the growth of microorganisms and calcium deposits. This can result in an unwanted change, especially a deterioration of the flavor and aroma of the beer. This can be prevented by cleaning with a solubilizing agent in accordance with the invention, especially in combination with sulfamic acid, since formation of calcium deposits is prevented.

An object of the invention is also the use of the solubilizing agent in papermaking. The use of the solubilizing agent for cleaning machines for papermaking is preferred in accordance with the invention.

An object of the invention is also the use of the solubilizing agent in the production of polycarbonates.

An object of the invention is also the use of the solubilizing agent in the production of dyes.

An object of the invention is also the use of the solubilizing agent as an additive in grinding or milling.

An object of the invention is also the use of the solubilizing agent for solubilization of trace elements in foods. The solubilization of the trace elements barium, manganese, copper and/or molybdenum is preferred in accordance with the invention.

An object of the invention is also the use of the solubilizing agent for stabilization of sodium aluminate, for example in titanium dioxide manufacturing.

An object of the invention is also the use of the solubilizing agent to prevent the precipitation of aluminum hydroxide and similar compounds, for example in aluminum etching operations.

An object of the invention is also the use of the solubilizing agent in the textile industry. The use of the solubilizing agent in the manufacturing of threads and yarns is preferred.

An object of the invention is also the use of the solubilizing agent as a component of washing agent compositions for textiles.

An object of the invention is also the use of the solubilizing agent as a component of bleach compositions for textiles.

An object of the invention is also the use of the solubilizing agent as a component of dye compositions for textiles.

An object of the invention is also the use of the solubilizing agent characterized in one of the above-mentioned claims to delay the setting of concrete. An object of the invention is also the use of the solubilizing agent characterized in one of the above-mentioned claims to delay the setting of cement or mortar.

An object of the invention is also the use of the solubilizing agent in cement, especially in cement that is used in drilling, for example oil boreholes.

An object of the invention is above all the use of the solubilizing agent in a washing or cleaning solution. An object of the invention is also a washing or cleaning solution that contains the agent in accordance with the invention as preferably the only solubilizing agent.

An object of the invention is also the use of the solubilizing agent as a component of developer baths for photographs and film.

One skilled in the art can without problem determine in a substantially known way the amount of the solubilizing agent in accordance with the invention when it is used in a washing solution. Preferably, the solubilizing agent is used in the washing solution in an amount of 2 wt % up to 100 wt %. In each case according to use, the solubilizing agent can be present in a washing solution in amounts of, for example, up to 5 wt %, up to 7 wt %, up to 10-20 wt %, especially up to 13 wt %, or up to 25 wt %.

The use of the solubilizing agent in accordance with the invention proved to be advantageous, particularly in liquid formulations in which the solubilizing agent can be used in a higher concentration because of its low tendency to crystallize.

In said uses in accordance with the invention, the invention preferably provides that the solubilizing agent be used in alkaline (aqueous) solutions starting with a pH value of 8 or higher; preferably the solubilizing agent is used in alkaline aqueous solutions starting with a pH of 11 or higher, preferably a solubilizing agent is used starting with a pH value of 12 or higher, preferably 13 or higher; especially preferably, the solubilizing agent is used in highly alkaline (aqueous) solutions starting with a pH value of 13.5 or 14 or higher. Preferably, the agent in accordance with the invention is used in the form of a syrup or in general in liquid form.

The invention is characterized by means of the figures and the embodiment examples, without these being understood to be limiting.

EXAMPLES

Example 1

Preparation of a Solubilizing Agent in Accordance with the Invention (Sol. D)

A solution of a commercially available technical starch hydrolyzate was oxidized on an $Al_2O_3$-supported gold catalyst in a stirred vessel. The reaction conditions were: T=40-80° C., pH=7-11, p=1-25 bar $O_2$. The pH of the reaction suspension was kept constant by titration with sodium hydroxide. The reaction was carried out to complete conversion. At the end of the reaction the catalyst was separated by filtration. The resulting oxidized syrup could be concentrated (65-75% DM) without further purification by suitable simple processes (dehydration) and used as a storable solubilizing agent.

Example 2

Comparison Measurements of Calcium Carbonate Dispersing Capacity of a Solubilizing Agent in Accordance with the Invention The calcium carbonate dispersing capacity (CCDC) of a solubilizing agent in accordance with the invention was compared with the CCDC of solubilizing agents from the prior art. A selectively C1-oxidized product from the oxidation of a starch hydrolyzate with dextrose equivalent (DE) of 55-60 and with 90 wt % DP2 compounds (Sol. A) was used as the solubilizing agent in accordance with the invention.

The dextrose equivalent (DE) was determined in a substantially known way by determining the reducing fractions of the composition, in particular following Fehling.

The CCDC was compared with that of the EDTA, NTA and Na gluconate. The CCDC values were determined in accordance with F. Richter and E. W. Winkler (Calcium Binding Capacity, Tenside Surfactants Detergents 24 (1987), pp. 213-216). The CCDC was measured at NaOH concentrations of 0.5, 1, 1.5, 2, 2.5 and 3%.

Figure 1:
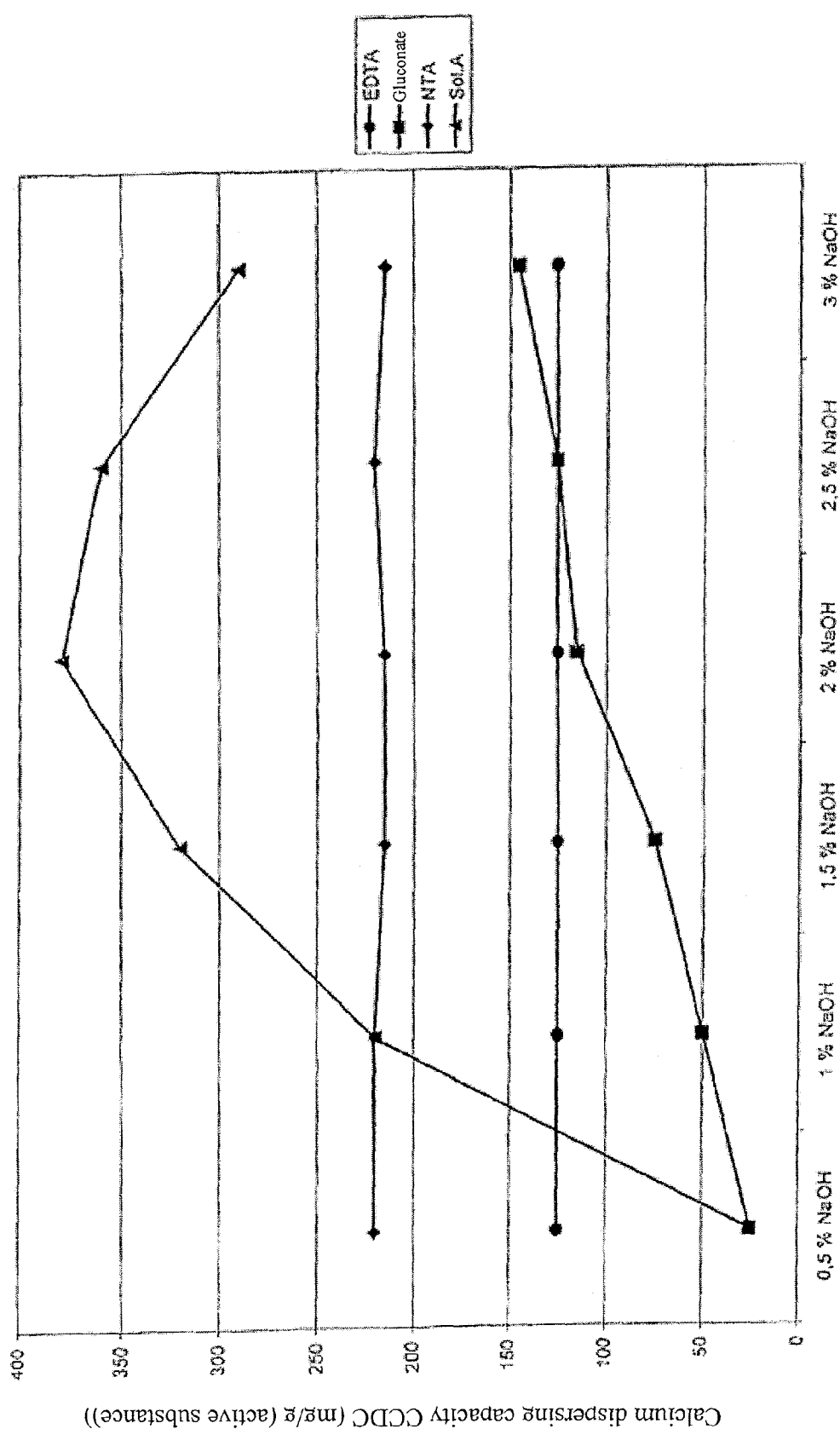
FIG. 1 shows the calcium carbonate dispersing capacity of a solubilizing agent in accordance with the invention compared to EDTA, NTA and gluconate in highly basic aqueous solutions.

The measurement results are illustrated in FIG. 1. Gluconate and the solubilizing agent in accordance with the invention show a clear pH dependency of their CCDC, but the effect of the solubilizing agent in accordance with the invention is stronger than that of the gluconate and is also stronger than in the case of EDTA and NTA in very basic solutions.

Example 3

Comparison Measurements of the Calcium Carbonate Dispersing Capacity of Different Solubilizing Agents in Accordance with the Invention In addition to the solubilizing agent in accordance with the invention from Example 2 (called Sol. A in what follows), three other solubilizing agents (Sol. B, Sol. C and Sol. D) in accordance with the invention were prepared. For this, starch hydrolyzates with different DE values and contents of DP2 and DP3 were oxidized in accordance with Example 1.

Sol. B was prepared from a starch hydrolyzate with a DP2 content of 5% and a dextrose equivalent (DE) of about 95. Sol. C was prepared from a starch hydrolyzate with a DP2 content of 40-46% and a DE of 40-45. Sol. D was prepared from a starch hydrolyzate with a DP content of 70-80% and a DE of about 50-55.

The CCDC of Sols. A, B, C and D was compared with that of gluconate and EDTA. The CCDC values were determined as in Example 2. The CCDC values were measured at NaOH concentrations of 1, 2 and 3%.

Figure 2:
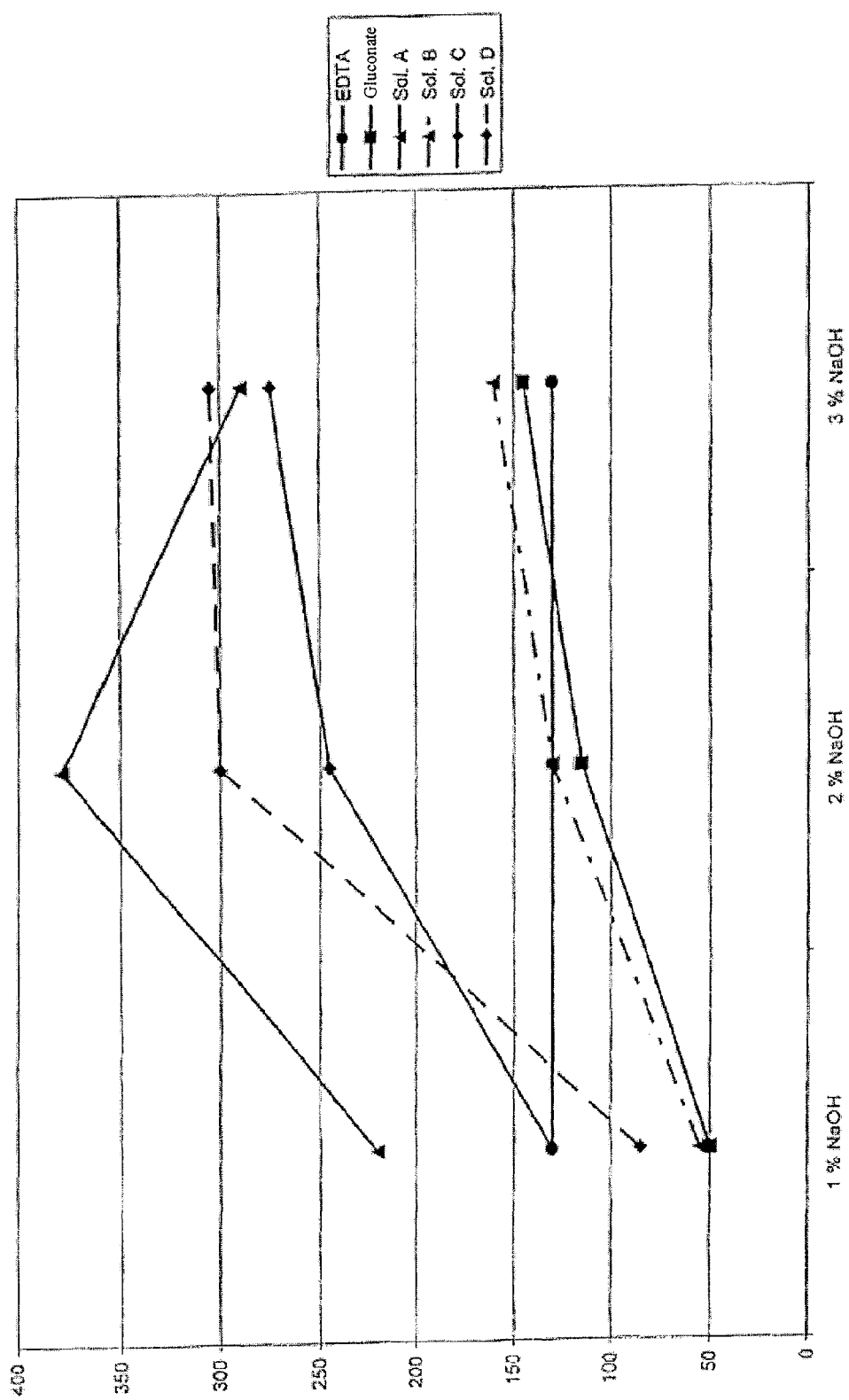
FIG. 2 shows the calcium carbonate dispersion capacity of four different solubilizing agents in accordance with the invention compared to EDTA and gluconate in highly basic aqueous solutions.

The measurement results are presented in FIG. 2. The solubilizing agents in accordance with the invention show an at least equally good CCDC to gluconate. Sol. A, Sol. C and Sol. D even show a distinctly better CCDC than gluconate over all three measurement points.

Example 4

Washing Solution for Cleaning Bottles

A washing solution for industrial cleaning of bottles can have, for example, the following composition:

| | |
|---|---|
| Sodium hydroxide: | 40-70 wt % |
| Solubilizing agent in accordance with the invention: | 10-20 wt % |
| Nonionic surfactant: | 1-10 wt % |
| Sodium metasilicate: | 10-25 wt % |
| Trisodium phosphoate or polyphosphates: | 5-10 wt % |

Example 5

Washing Solution for Industrial Cleaning of Dishware a) A powdered washing agent for industrial cleaning of dishware can have, for example, the following composition:

| | |
|---|---|
| Surfactants: | 3 wt % |
| Phosphates: | 50 wt % |
| Sodium metasilicate•5H$_2$O: | 25 wt % |
| Sodium hydroxide: | 15 wt % |
| Solubilizing agent in accordance with the invention: | 5 wt % |
| Sodium dichloroisocyanurate: | 2 wt % | b) A liquid solution for industrial cleaning of dishware can have, for example, the following composition:

| | |
|---|---|
| Water: | 59 wt % |
| Solubilizing agent in accordance with the invention: | 13 wt % |
| Potassium hydroxide: | 21 wt % |
| Sodium metasilicate•5H$_2$O: | 4 wt % |
| Sodium carbonate: | 2 wt % |
| Sodium hypochloride: | 1 wt % |

Example 6

Composition for Cleaning Ultrafiltration Membranes

For example, the following composition can be used for cleaning ultrafiltration membranes:

| | |
|---|---|
| Sodium hydroxide: | 49 wt % |
| Solubilizing agent in accordance with the invention: | 25 wt % |
| Disodium salt of EDTA: | 24 wt % |
| Anionic surfactant: | 1 wt % |

This composition can be used in the washing solution in a concentration of, for example, 10 g/L.

Example 7

Composition for Chemical Degreasing of Metal Surfaces

Various compositions can be used in each case according to the metal that is to be cleaned.

The degreasing solution can be used, for example, at temperatures of 60° C. for zinc alloys or 75° C. in the case of steel and copper alloys.

The data are to be understood as grams of substance per liter of degreasing solution. Water is used as solvent.

| | Steel: | Copper alloy: | Zinc alloy: |
|---|---|---|---|
| Sodium hydroxide: | 40 | 15 | 8 |
| Sodium carbonate: | 15 | 5 | 8 |
| Sodium orthophosphate: | 15 | 5 | 10 |
| Borax: | — | — | 5 |
| Solubilizing agent in accordance with the invention: | 20 | 25 | 20 |
| Anionic surfactant | 0.3 | 0.3 | 0.3 |

The Invention claimed is:

1. A solubilizing agent for sparingly soluble metal ions or compounds which is a starch hydrolyzate that has a content of 5 to 90 wt % DP2 compounds and has been selectively oxidized at C1 in combination with a further ingredient which is at least one member of the group consisting of surface-active substance, alkali, silicate, aluminosilicate, phosphate, and mixtures thereof.

2. A solubilizing agent according to claim 1, where the starch hydrolyzate has a content of 10-85 wt % DP2 compounds.

3. A solubilizing agent according to claim 1, where the starch hydrolyzate has a dextrose equivalent in the range of DE 50 to DE 55.

4. A solubilizing agent according to claim 1, in which there is more than 90 wt % monocarboxylated compounds.

5. A method for solubilization of metal ions comprising bringing the solubilizing agent according to claim 1 into contact under conditions that enable the formation of a complex of at least one metal ion and at least one molecule of the solubilizing agent.

6. A solubilizing agent according to claim 1 in combination with a dishwashing composition.

7. A solubilizing agent according to claim 1 in combination with an electroplating bath.

8. A solubilizing agent according to claim 1 in combination with a degreasing composition.

9. A solubilizing agent according to claim 1 in combination with a washing agent composition for textiles.

10. A solubilizing agent according to claim 1 in combination with a bleach composition for textiles.

11. A solubilizing agent according to claim 1 in combination with a dye composition for textiles.

12. A solubilizing agent according to claim 1 in combination with a concrete composition.

13. A solubilizing agent according to claim 1 in combination with a slightly alkaline aqueous solution having a pH of 8 or higher.

14. A solubilizing agent according to claim 1 in combination with a developer bath for photographs and film.

15. A method for preparation of a solubilizing agent for sparingly soluble metal compounds comprising
providing a starch hydrolyzate composition with a content of 5 to 90 wt % DP2 compounds, and
catalytic oxidizing the C1-position carbon atom of at least one carbohydrate in the starch hydrolyzate composition without effecting any substantially oxidization of other carbon atoms in the carbohydrates in the starch hydrolyzate composition, and
combining the resulting composition with at least one member of the group consisting of surface-active substance, alkali, silicate, aluminosilicate, phosphate, and mixtures thereof.

16. A method of solublization of a material containing a metal ion or metal compound which comprising bringing a solubilizing agent which is a starch hydrolyzate that has a content of 5 to 90 wt % DP2 compounds and has been selectively oxidized at C1 into contact with said material in less than equimolar amounts with respect to the metal ions.

17. A solubilizing agent according to claim 1, which is free of C2 and C3 carboxylated compounds and in which there is more than 90 wt % of the compounds thereof are monocarboxylated at C1.

18. A method of solubilization according to claim 16 wherein said material comprises a sparingly soluble metal compound of di- or trivalent metal cations selected from the group consisting of magnesium, manganese, calcium, copper, iron, zinc, nickel, chromium and aluminum.

19. A method of solubilization according to claim 16 wherein said material comprises a builder for detergents and washing agents.

20. A method of solubilization according to claim 16 wherein said material comprises a surface in need of wetting.

21. A method of solubilization according to claim 16 wherein said material comprises a layer of microorganisms.

22. A method of solubilization according to claim 16 wherein said material comprises residues and deposits in industrial plants or machines.

23. A method of solubilization according to claim 16 wherein said material comprises dishware.

24. A method of solubilization according to claim 16 wherein said material comprises glass bottles.

25. A method of solubilization according to claim 16 wherein said material comprises residues and deposits in electroplating baths.

26. A method of solubilization according to claim 16 wherein said material comprises concrete depositions and impurities.

27. A method of solubilization according to claim 16 wherein said material comprises a mold-containing surface.

* * * * *